United States Patent
Miethig

(10) Patent No.: US 11,230,235 B2
(45) Date of Patent: Jan. 25, 2022

(54) CAMERA ARM OF A CAMERA-BASED MIRROR SUBSTITUTE SYSTEM FOR A MOTOR VEHICLE

(71) Applicant: Continental Automotive GmbH, Hannover (DE)

(72) Inventor: Werner Miethig, Brigachtal (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/908,173

(22) Filed: Jun. 22, 2020

(65) Prior Publication Data
US 2020/0317142 A1    Oct. 8, 2020

Related U.S. Application Data

(63) Continuation of application No. PCT/EP2018/084404, filed on Dec. 11, 2018.

(30) Foreign Application Priority Data

Dec. 22, 2017    (DE) .................... 10 2017 223 716.3
Apr. 17, 2018    (DE) .................... 10 2018 205 848.2

(51) Int. Cl.
*B60R 11/04*    (2006.01)
*B60R 1/06*    (2006.01)
(Continued)

(52) U.S. Cl.
CPC ............ *B60R 11/04* (2013.01); *B60R 1/0617* (2013.01); *F16H 3/44* (2013.01); *G03B 17/04* (2013.01);
(Continued)

(58) Field of Classification Search
CPC .................. B60R 11/04; B60R 1/0617; B60R 2011/0082; B60R 2300/8046;
(Continued)

(56) References Cited

U.S. PATENT DOCUMENTS 4,168,635 A    9/1979    Savidan
5,012,693 A    5/1991    Enomoto et al.
(Continued)

FOREIGN PATENT DOCUMENTS

AT    310591 B    10/1973
DE    2826938 A1    1/1980
(Continued)

OTHER PUBLICATIONS

Office Action dated Aug. 13, 2018 from corresponding German Patent Application No. DE 10 2018 205 848.2.
(Continued)

*Primary Examiner* — James M Pontius
*Assistant Examiner* — Tyler B Edwards

(57) ABSTRACT

A camera arm of a camera-based mirror substitute system for a motor vehicle comprises a first structural element for connecting the camera arm to a motor vehicle and a second structural element which comprises at least one camera, the second structural element being pivotable in relation to the first structural element. In order to provide a fastening for cameras of camera monitor systems for mirror substitution in motor vehicles, said fastening offering improved protection against external damaging influences on the fastening and on all elements, devices and modules, in particular cameras, arranged thereon, and enabling an optimum image area of the camera, it is proposed that the second structural element and the first structural element are connected to one another by way of a pivoting mechanism, the pivoting mechanism comprising a planetary gearing.

14 Claims, 3 Drawing Sheets

(51) Int. Cl.
*G03B 17/04* (2021.01)
*F16H 3/44* (2006.01)
*B60R 11/00* (2006.01)

(52) U.S. Cl.
CPC .............. *B60R 2011/0082* (2013.01); *B60R 2300/8046* (2013.01)

(58) Field of Classification Search
CPC .......... B60R 16/023; F16H 3/44; F16H 1/28; G03B 17/04; G03B 17/561; H04N 5/2257; B60Y 2400/73; B60Y 2400/30
See application file for complete search history.

(56) References Cited

U.S. PATENT DOCUMENTS

| | | | |
|---|---|---|---|
| 2004/0085444 A1* | 5/2004 | Ho | H04N 7/185 348/143 |
| 2008/0273715 A1 | 11/2008 | Snider et al. | |
| 2012/0293656 A1* | 11/2012 | Schutz | H04N 5/2257 348/148 |
| 2014/0036081 A1* | 2/2014 | Lang | B60R 1/00 348/148 |
| 2014/0285666 A1 | 9/2014 | O'Connell et al. | |
| 2015/0097955 A1 | 4/2015 | De Wind et al. | |
| 2015/0291080 A1 | 10/2015 | Lang et al. | |
| 2016/0065796 A1 | 3/2016 | Happy et al. | |
| 2016/0243988 A1* | 8/2016 | Peterson | G06K 9/00805 |
| 2017/0101058 A1 | 4/2017 | Park | |
| 2017/0259753 A1 | 9/2017 | Meyhofer | |
| 2017/0297535 A1 | 10/2017 | Zhang et al. | |

FOREIGN PATENT DOCUMENTS

| | | |
|---|---|---|
| DE | 102012015398 B3 | 10/2013 |
| DE | 102012015395 B3 | 11/2013 |
| DE | 102014005610 A1 | 10/2015 |
| DE | 102016102508 A1 | 8/2017 |
| DE | 102017112867 A1 | 12/2017 |
| EP | 0209666 A2 | 1/1987 |
| FR | 2369122 A1 | 5/1978 |
| JP | H04345548 A | 12/1992 |
| JP | 2003063310 A | 3/2003 |
| JP | 2005306266 A | 11/2005 |
| JP | 2010107772 A | 5/2010 |
| JP | 2010247645 A | 11/2010 |
| JP | 2014129046 A | 7/2014 |
| JP | 2014231333 A | 12/2014 |
| JP | 2016016774 A | 2/2016 |
| JP | 2017035928 A | 2/2017 |
| JP | 2017039377 A | 2/2017 |
| WO | 02/090149 A1 | 11/2002 |

OTHER PUBLICATIONS

International Search Report and Written Opinion dated Feb. 11, 2019 from corresponding International Patent Application No. PCT/EP2018/084404.

Notice of Allowance dated Nov. 17, 2021 from corresponding Japanese patent application No. JP 2020-534468.

* cited by examiner

CAMERA ARM OF A CAMERA-BASED MIRROR SUBSTITUTE SYSTEM FOR A MOTOR VEHICLE

CROSS-REFERENCE TO RELATED APPLICATIONS

This U.S. patent application claims the benefit of PCT patent application No. PCT/EP2018/084404, filed Dec. 11, 2018, which claims the benefit of German patent applications No. 10 2017 223 716.3, filed Dec. 22, 2017 and 10 2018 205 848.2 filed Apr. 17, 2018, all of which are hereby incorporated by reference.

TECHNICAL FIELD

The invention relates to a camera-based mirror substitute system for a motor vehicle.

BACKGROUND

Rear-view mirrors, which grant a driver of a motor vehicle a view toward the rear, are ubiquitous and legally prescribed in motor vehicles. In the future, it is intended for the customary rear-view mirrors to be substituted by camera monitor systems. In this way, a view toward the rear is granted in that images recorded by cameras are displayed on monitors to a driver of a motor vehicle.

For such camera-based mirror substitute systems for commercial vehicles, it is expedient not to mount the cameras directly on the vehicle body, but to space them apart therefrom: Known rear-view mirrors are at a certain distance from the vehicle body. As a result, a favorable field of view is afforded, for example. In this case, distances between the mirror and the body of the order of magnitude of 5 cm to several tens of centimeters are customary, for example 80 cm for a particularly wide field of view in the case of greatly out-swinging vehicle combinations, heavy-duty transporters, agricultural machines, mining vehicles and equipment.

For an arrangement of cameras of camera-based mirror substitute systems on vehicles, in particular as a substitute for exterior mirrors or side mirrors, it is therefore desirable to also arrange the cameras at a distance from the body. To this end, use can be made of camera arms, which can be attached, for example, to vehicle cabins.

Rigid arrangements of cameras do not offer the mechanical design, the cameras and further modules, elements and devices arranged with the cameras on the camera arms adequate protection against damaging external influences, such as forces from all sides, impact loads and shock loads. Rigid fastenings are sensitive to the potential damaging effects of mechanical force application.

It is therefore desirable to provide a fastening (in the form of a camera arm) for cameras of camera monitor systems for mirror substitution in motor vehicles, said fastening offering improved protection against external damaging influences on the fastening or the camera arm and on all elements, devices and modules, in particular cameras, arranged thereon, and enabling an optimum image area of the camera.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A camera arm, proposed here, of a camera-based mirror substitute system for a motor vehicle comprises a first structural element for connecting the camera arm to a motor vehicle and a second structural element which comprises at least one camera, the second structural element being able to be pivoted in relation to the first structural element. The camera arm proposed here is characterized in that the second structural element and the first structural element are connected to one another by way of a pivoting mechanism, the pivoting mechanism comprising a planetary gearing. By way of example, the second structural element cannot be pivoted in relation to the first structural element about a positionally fixed axis. Preferably, the pivoting mechanism is configured in such a way that the pivoting movement of the second structural element in relation to the first structural element follows a cycloid curve.

The terms image area, area of vision, field of vision and field of view are to be understood synonymously. An area of vision of a camera represents the area that a camera "sees". Said camera relays said area in the form of an image. Accordingly, the image area results from the area of vision. However, the area of vision of said camera also corresponds to the field of vision. Field of view is in any case a synonym for field of view. Viewing angle can be understood to mean an angle which defines a field of view. Viewing angle is also a synonym for perspective.

In a particular embodiment, the first structural element and the second structural element of the camera arm are connected to one another directly by means of the pivoting mechanism, that is to say that the pivoting mechanism forms the connection between the first and the second structural element of the camera arm. Said design makes it possible to save on further parts, which allows for low costs, low mass and a compact construction of a camera arm.

In a further embodiment of a camera arm proposed here, the second structural element and the first structural element are connected to one another by way of more than one pivoting mechanism. Such a camera arm could thus comprise a plurality of pivoting mechanisms, for example. That could mean, for example, two or more planetary gearings. Or else a combination, which comprises a planetary gearing and a pivoting mechanism other than a planetary gearing, for example a pivoting mechanism with a ball joint or an axial joint. Said embodiment makes enhanced movability of such a camera arm possible.

In a further embodiment of a camera arm proposed here, the second structural element and the first structural element are connected to one another by way of a pivoting mechanism and additional structural elements. The use of additional structural elements has the result that the camera arm can be attached to a vehicle in a wider variety of ways and is suitable for a larger spectrum of arrangement positions.

In a further embodiment of a camera arm proposed here, the pivoting mechanisms are embodied such that the camera arm can be pivoted about at least two axes, the axes not lying parallel to one another. Particularly, this has the result that the camera arm is movable in three dimensions and is insensitive to damaging force applications which act from three dimensions because it can yield to said force applications. A camera arm outfitted with two pivoting mechanisms having non-parallel axes can, if it extends perpendicularly from a vehicle and transversely with respect to the direction of travel, the longitudinal axis of said arm thus being perpendicular, for example, to a vehicle cabin wall, absorb forces which arise along the longitudinal axis by virtue of the arm being distorted as a whole by way of the at least two pivoting mechanisms. In this case, that point of such a camera arm which is most remote from the vehicle and which can be located for example on the second structural element is thus brought closer to the cabin wall. If a first pivoting mechanism permits pivoting movements about a vertical axis or in a horizontal plane, it is for example able to tolerate external forces acting parallel to the direction of travel on the second structural element of the camera arm, by virtue of the arm pivoting in said first pivoting mechanism. The first pivoting mechanism possibly might not be able to yield to forces acting perpendicularly with respect to said plane. However, since the second pivoting mechanism can be pivoted about an axis which is not parallel to the pivoting axis of the first mechanism, that is to say also in a plane which is not parallel to the movement plane of the first mechanism, the arm is also able to yield to forces acting in said direction by virtue of the second pivoting mechanism. Overall, this thus moreover indirectly results in improved robustness of the camera arm in relation to a wide variety of external force applications, the damaging effects of which are consequently minimized.

A further embodiment of a camera arm proposed here comprises more than one camera. Firstly, this results in that, if the intention is to cover a single field of view, additional information, for example depth information, about the image content can be obtained. Secondly, it is possible in this case to combine cameras with different image-capturing properties; for example a camera with telephoto properties and a camera with wide-angle properties.

In a further embodiment of a camera arm proposed here, the at least two cameras cover at least two different fields of view. Firstly, this has the result that different viewing angles can be covered with cameras from a single camera arm. Secondly, it is possible in this case to combine cameras with different image-capturing properties; for example a camera with telephoto properties for a narrow image area, which reaches into the distance, possibly to the horizon, and a camera with wide-angle properties for a wide image area.

In a further embodiment of a camera arm proposed here, which comprises more than one camera and in which the at least two cameras cover at least two different image areas or at least partially cover the same image area, the second structural element comprises the at least two cameras. Firstly, this results in an arrangement of the cameras which is spaced particularly far apart from the vehicle. Secondly, this also has the result that, as a result of the exchange of the second structural element, for example in the case of maintenance or repair work, the at least two cameras are exchanged all at once in one operation.

In a further embodiment of a camera arm proposed here, which comprises more than one camera and in which the at least two cameras cover at least two different fields of view or at least partially cover the same field of view, the first structural element comprises at least one camera and the second structural element comprises at least one camera. Thus, it is made possible for the at least two cameras to cover image areas which differ from one another to a greater extent.

In a further embodiment of a camera arm proposed here, the second structural element additionally comprises at least one mirror. This makes it possible to use the mirror in an emergency situation in order to ensure visibility, for example if a problem occurs concerning the power supply of the mirror substitute system or if other malfunctions occur.

A further embodiment of a camera arm proposed here additionally comprises sensors. This has the result that said sensors can also be arranged at otherwise inaccessible positions on the vehicle, since a camera arm protrudes beyond the vehicle itself. Furthermore, the sensors used can for example make improved or enhanced functionality of the camera arm outfitted therewith possible, for example by virtue of distance sensors, for example ultrasonic sensors, being arranged in such an arm and the latter being able to be folded in by means of a control unit if an obstacle which may collide with said arm is detected. Such distance warning systems can for example be provided in the manner of ultrasonic distance warning systems which are used as parking aids in passenger cars.

Preferably, the second structural element comprises the additional sensor or sensors.

A further embodiment of a camera arm proposed here additionally comprises communication apparatuses. This makes it possible to utilize a camera arm, which is outfitted in such a manner, for communication. Communication apparatuses in this context can for example be lamps, lights, indicator lights and/or loudspeakers and/or microphones.

Preferably, the second structural element comprises the communication apparatuses.

An embodiment of a camera arm proposed here additionally comprises one or more of the following devices: a radio antenna for communication, a position light, a heating element, a cleaning device for cleaning camera lenses or camera covers. By way of example, arrangement of a radio antenna can make improved reception and transmission properties for the antenna possible. Heating elements can provide freedom from ice and work against the accumulation of water on cameras or camera arms. Cleaning devices for cleaning camera lenses or camera covers can improve the operation of the cameras. Position lights can be arranged on the camera arm in order to thereby draw attention to the position which is occupied by the camera arm.

Additionally, the second structural element may comprise the additional devices, such as radio antenna, position light, heating elements, etc.

The radio antenna can for example be utilized for digital communication, for example for vehicle-to-vehicle communication or vehicle-to-infrastructure communication or for mobile radio or Wireless Local Area Network connections or for DSRC or for NFC or for mobile radio (for example for GSM, UMTS, LTE, 2G, 3G, 4G, 5G, LTE light, 2.5G, etc.) or for receiving GNSS signals and signals of similar systems (for example Galileo, GPS, Glonass, Beidou, QZSS, GAGAN, etc.) or for digital radio reception DAB. The integration of an antenna into a camera arm affords improved reception.

A radio antenna for communication can also be an antenna for communication with infrastructure or with other vehicles, for example via WIMAX, WIFI, NFC or BLUETOOTH®.

A further embodiment of a camera arm proposed here can be latched in a predetermined operating position. This has the result that the camera arm can be reliably latched in a position for driving operation, for example.

In a further embodiment of a camera arm proposed here, which can be latched in a predetermined operating position, the latching means is designed such that it makes it possible for the camera arm to withstand the forces exerted by wind and relative wind, but such that, in the case of greater forces, a movement of the camera arm out of the operating position is permitted. This has the result that the camera arm remains in the operating position in normal driving operation, but yields if collisions or other damaging external force applications arise, and thus the damaging effect is minimized.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of the preferred embodiment(s) is merely exemplary in nature and is in no way intended to limit the invention, its application, or uses. Identical elements or elements of the same type or with equivalent actions may be denoted by the same reference signs throughout the figures.

Figure 1:
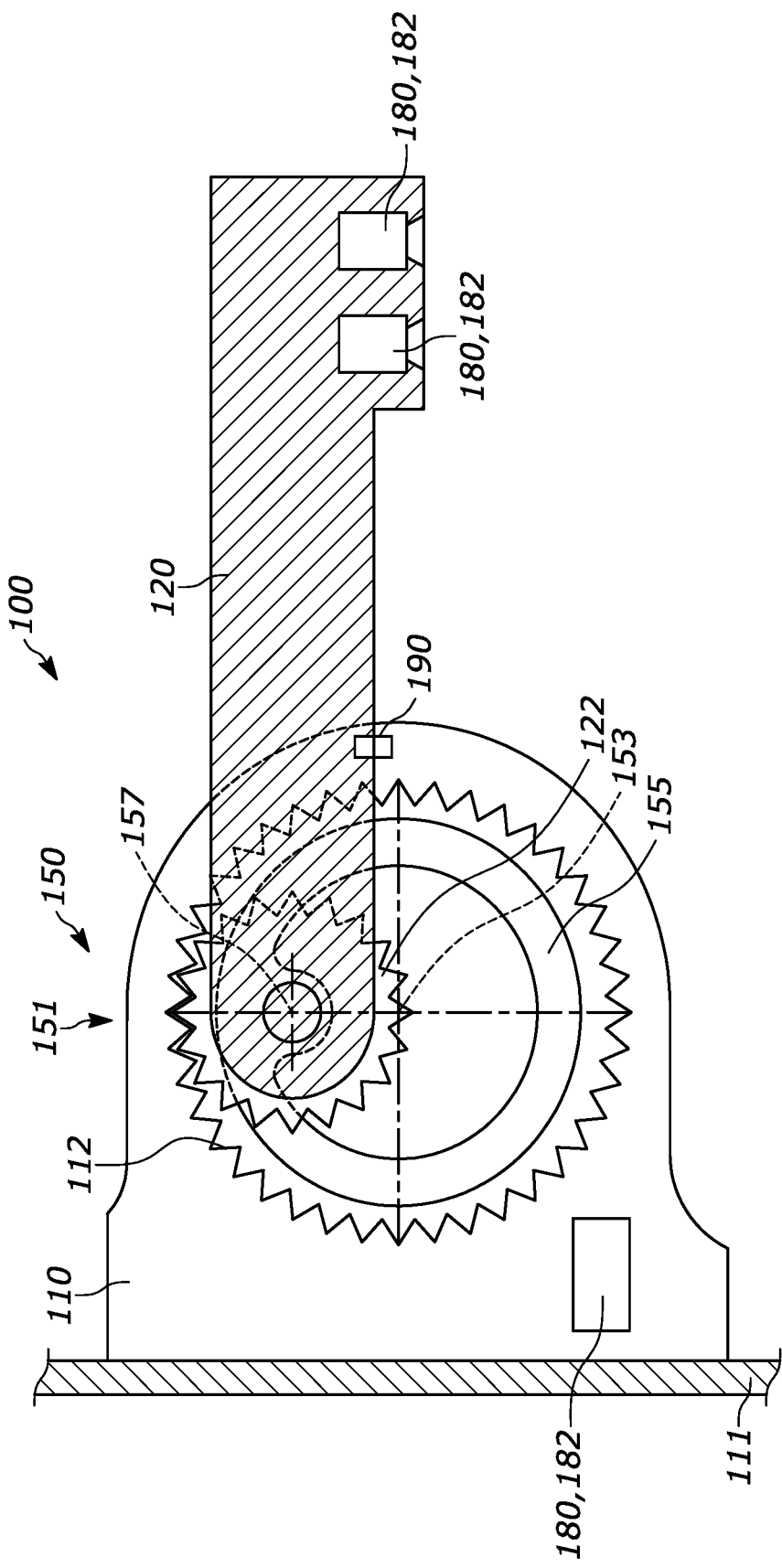
FIG. 1 shows a sectional drawing of an exemplary embodiment of a camera arm in a first movement state.

FIG. 1 shows a sectional drawing of an exemplary embodiment of a camera arm 100 according to the invention with a pivoting mechanism having a planetary gearing 151.

FIG. 1 shows a camera arm 100 in a first movement state, in which the camera arm is located in a folded-out position, that is to say in an operating position for example for driving operation of a motor vehicle on which the camera arm 100 can be arranged.

In this embodiment, the first structural element 110 comprises a cutout which is provided with an internal toothing 112. Furthermore, the first structural element 110 comprises a first rotary bearing, that is to say a bearing which makes it possible for an element received therein to rotate about a first axis of rotation 153. Said first axis of rotation 153 of the first rotary bearing is arranged coaxially with the internal toothing 112. A rotary disk 155 of the planetary gearing 151 is received in said first rotary bearing, said disk being able to be rotated in relation to the first structural element 110 about the first axis of rotation 153 and comprising a second rotary bearing with a second axis of rotation 157. The second axis of rotation 157 is the axis of rotation of the second rotary bearing. The second axis of rotation 157 is arranged eccentrically, that is to say offset in relation to the first axis of rotation 153, on the rotary disk 155. The second structural element 120 of the camera arm 100 comprises a gearwheel 122 with external toothing. The second structural element 120 is arranged on the rotary disk 155 such that the rotary axis of the gearwheel 122 lies coaxially with the second axis of rotation 157. At the same time, the second structural element 120 with the gearwheel 122, the rotary disk 155 and the first structural element 110 with the internal toothing 112 are arranged such that the teeth of the gearwheel 122 engage in the internal toothing 112, and vice versa.

In other words, the cutout in the first structural element 110 with internal toothing 112 and the rotary disk 155 mounted coaxially therein, together with the second structural element 120 which is mounted eccentrically on the rotary disk 155 and with the gearwheel 122, form a planetary gearing 151, which, as a pivoting mechanism, makes it possible for the second structural element 120 to be pivoted in relation to the first structural element 110.

In this case, it is possible for example for a shaft to be arranged on the rotary disk 155 such that it lies coaxially with the second axis of rotation 157, that is to say eccentrically with respect to the rotary disk 155, and can thus be used as a rotary bearing. In the exemplary embodiment shown, the gearwheel 122 can be received by said shaft on the second axis of rotation 157.

The planetary gearing 151 imparts a combined movement about the first axis of rotation 153 and the second axis of rotation 157 by way of gearing parts, comprising an internal toothing 112, a gearwheel with external toothing 122 and a rotary disk 155.

By way of example, the second structural element 120 is configured as one part with gearwheel 122. In another example, the second structural element 120 and the gearwheel 122 can be produced separately and, after production, fixedly connected, for example by welding, adhesive bonding, screwing or other customary connecting techniques.

In the exemplary embodiment shown, the second structural element 120 comprises two cameras 180. The two cameras 180 may record different viewing angles and/or image areas.

The first structural element 110 of the camera arm 100 comprises a contact surface 111 which is in contact with a motor vehicle when the camera arm is attached to a motor vehicle.

Figure 2:
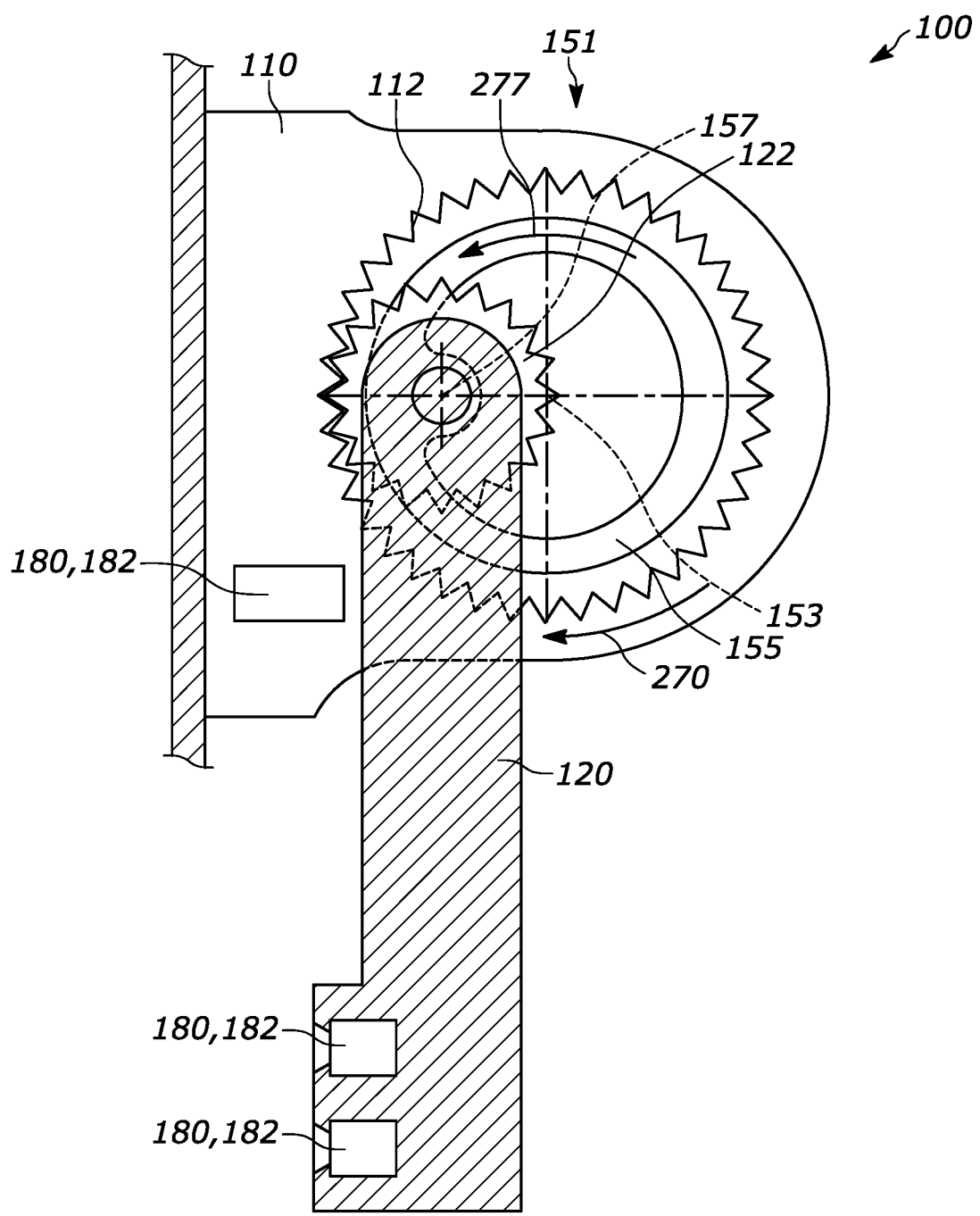
FIG. 2 shows a sectional drawing of the same exemplary embodiment of a camera arm as in FIG. 1 but in a second movement state (which is different from the first movement state)

FIG. 2 shows the same embodiment of a camera arm 100 in a second movement state. Here, the second structural element 120 is in a position parallel to the contact surface 111 of the first structural element 110, which can be brought into contact with a motor vehicle. The movement state shown in FIG. 2 can for example be obtained, as outlined in the section above, proceeding from that movement state of the camera arm 100 which is shown in FIG. 1, as a result of an external force acting on the second structural element 120.

If, for example, an external force acts on the second structural element 120 and brings about a movement of the second structural element 120 in relation to the first structural element in a first direction of rotation 270, which runs in a clockwise direction in the view shown in FIGS. 1 and 2, said movement of the second structural element 120 relative to the first structural element 110 is accompanied directly by a movement of the gearwheel 122 relative to the internal toothing 112 because the gearwheel 122 is fixedly connected to the second structural element 120 and the internal toothing 112 is arranged in a cutout of the first structural element 110. The relative rotational movement of the gearwheel 122 in relation to the internal toothing 112 therefore results in a rolling movement of the gearwheel 122 on the internal toothing 112, in the case of which the gearwheel 122 in turn rotates the rotary disk 155 relative to the first structural element 110, since the gearwheel 122 is arranged, on the second axis of rotation 157, eccentrically on the rotary disk 155. That means that the second axis of rotation 157 in this case moves in a second direction of rotation 277, which runs in a counter-clockwise direction in the view shown in FIGS. 1 and 2, relative to the first structural element 110. The first direction of rotation 270 is always counter to the second direction of rotation 277.

The second movement state corresponds to a folded-in position of a camera arm, such as can be occupied by said camera arm for example in order to avoid a collision with obstacles during a journey of a vehicle outfitted with a camera arm 100 in confined conditions. This is for example a folded-in operating position. On the other hand, such a movement state could also be representative of a position specifically not for operation, for example representative of a parked and inoperative vehicle. By way of example, the movement state shown in FIG. 2 could also be occupied as a result of a collision of the camera arm with obstacles and a consequent yielding movement of the camera arm.

Figure 3:
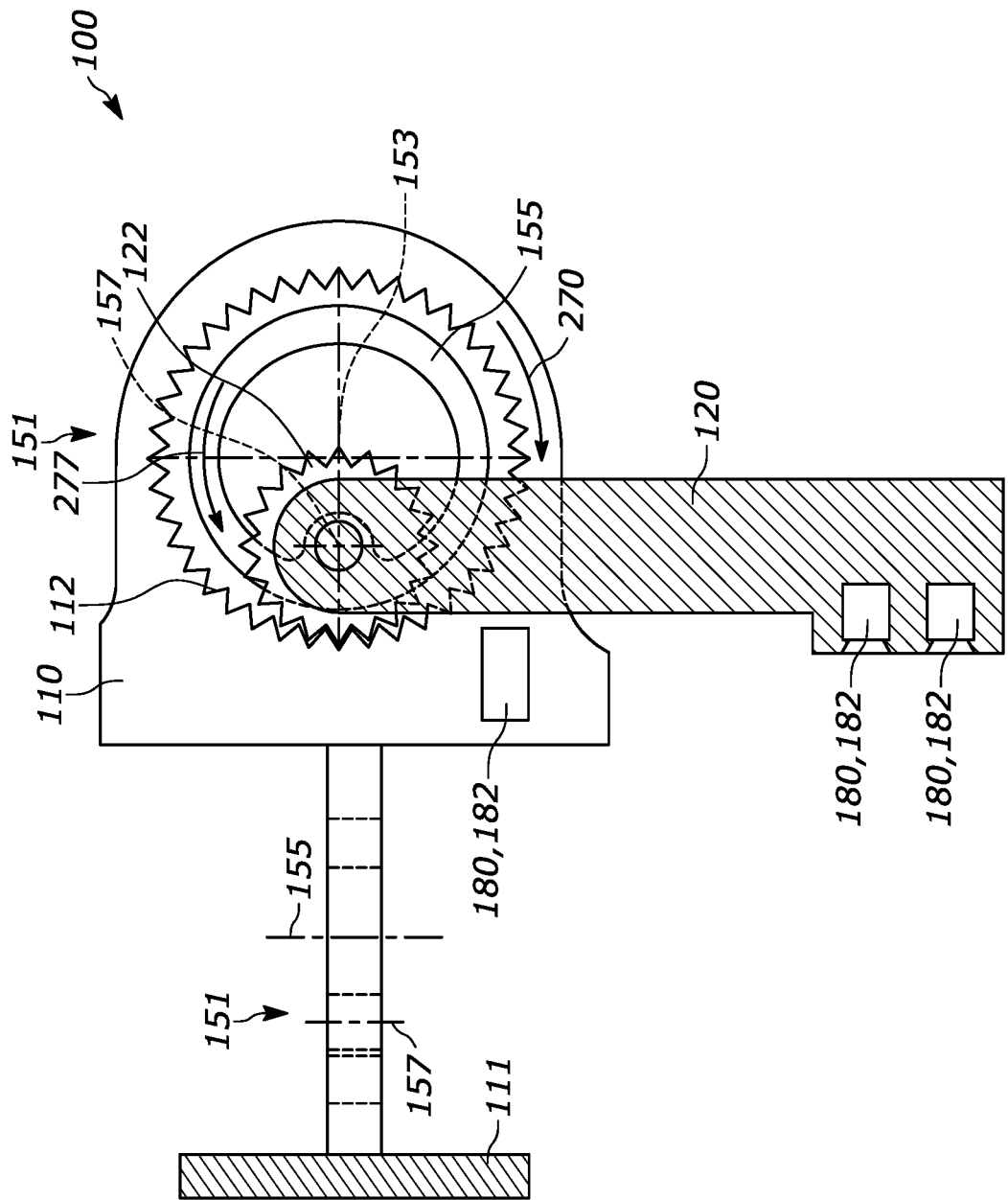
FIG. 3 shows another embodiment of an exemplary camera arm having two pivoting mechanisms.

In a further embodiment of a camera arm shown in FIG. 3, the pivoting mechanisms 151 are embodied such that the camera arm 100 can be pivoted about at least two axes, the axes not lying parallel to one another. Particularly, this has the result that the camera arm 100 is movable in three dimensions and is insensitive to damaging force applications which act from three dimensions because it can yield to said force applications. A camera arm outfitted with two pivoting mechanisms 151 having non-parallel axes can, if it extends perpendicularly from a vehicle and transversely with respect to the direction of travel, the longitudinal axis of said arm thus being perpendicular, for example, to a vehicle cabin wall, absorb forces which arise along the longitudinal axis by virtue of the arm being distorted as a whole by way of the at least two pivoting mechanisms 151. In this case, that point of such a camera arm 100 which is most remote from the vehicle and which can be located for example on the second structural element 120 is thus brought closer to the cabin wall. If a first pivoting mechanism permits pivoting movements about a vertical axis or in a horizontal plane, it is for example able to tolerate external forces acting parallel to the direction of travel on the second structural element of the camera arm, by virtue of the arm pivoting in said first pivoting mechanism. The first pivoting mechanism possibly might not be able to yield to forces acting perpendicularly with respect to said plane. However, since the second pivoting mechanism can be pivoted about an axis which is not parallel to the pivoting axis of the first mechanism, that is to say also in a plane which is not parallel to the movement plane of the first mechanism, the arm is also able to yield to forces acting in said direction by virtue of the second pivoting mechanism. Overall, this thus moreover indirectly results in improved robustness of the camera arm in relation to a wide variety of external force applications, the damaging effects of which are consequently minimized.

Referring again to FIGS. 1-3 an embodiment of a camera arm 100 proposed here additionally comprises one or more of the following devices, illustrated schematically at 182: a radio antenna for communication, a position light, a heating element, a cleaning device for cleaning camera lenses or camera covers. By way of example, arrangement of a radio antenna can make improved reception and transmission properties for the antenna possible. Heating elements can provide freedom from ice and work against the accumulation of water on cameras or camera arms. Cleaning devices for cleaning camera lenses or camera covers can improve the operation of the cameras. Position lights can be arranged on the camera arm in order to thereby draw attention to the position which is occupied by the camera arm.

Additionally, the second structural element may comprise the additional devices 182, such as radio antenna, position light, heating elements, etc.

In a further embodiment of a camera arm 100 proposed here, which can be latched in a predetermined operating position (shown in FIG. 1), the latching means 190 is designed such that it makes it possible for the camera arm to withstand the forces exerted by wind and relative wind, but such that, in the case of greater forces, a movement of the camera arm out of the operating position is permitted (shown in FIG. 2). This has the result that the camera arm remains in the operating position in normal driving operation, but yields if collisions or other damaging external force applications arise, and thus the damaging effect is minimized.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A camera arm of a camera-based mirror substitute system for a motor vehicle comprising:
a first structural element for connecting to a motor vehicle, wherein the first structural element defines a recess provided with internal teeth which are arranged about a first axis;
a second structural element which comprises at least one camera, pivotable in relation to the first structural element;
a pivoting mechanism connecting the first structural element and the second structural element, wherein the pivoting mechanism is a planetary gear set having a gear with external gear teeth rotatably secured to the second structural element, wherein the gear rotates about a second axis of rotation which is eccentrically spaced from the first axis of rotation.

2. The camera arm as claimed in claim 1, wherein the first structural element and the second structural element are connected to one another directly with the pivoting mechanism.

3. The camera arm as claimed in claim 1, wherein the second structural element and the first structural element are connected to one another with more than one pivoting mechanism.

4. The camera arm as claimed in claim 3, wherein the camera arm can be pivoted about at least two axes with the pivoting mechanism, and wherein the axes are not parallel to one another.

5. The camera arm as claimed in claim 1, further comprising at least two cameras.

6. The camera arm as claimed in claim 5, wherein the at least two cameras cover at least two different image areas.

7. The camera arm as claimed in claim 5, wherein the second structural element comprises the at least two cameras.

8. The camera arm as claimed in claim 5, wherein the first structural element comprises at least one camera and the second structural element comprises at least one camera.

9. The camera arm as claimed in claim 1, wherein the second structural element further comprises at least one mirror.

10. The camera arm as claimed in claim 1, further comprising sensors.

11. The camera arm as claimed in claim 1, further comprising communication apparatuses.

12. The camera arm as claimed in claim 1, further comprising at least one of: a radio antenna for communication, a position light, a heating element, and a cleaning device for cleaning camera lenses and camera covers.

13. The camera arm as claimed in claim 1, wherein the camera arm is secured in a predetermined operating position by a latching device.

14. The camera arm as claimed in claim 13, further comprising a first force, wherein the latching device secures the camera arm to remain in the predetermined operating position when the first force is applied and a second force, wherein the second force is greater than the first force, wherein the latching device permits the camera arm to move from the predetermined operating position when the second force is applied.

* * * * *